US008245607B2

(12) United States Patent
Kozak

(10) Patent No.: US 8,245,607 B2

(45) Date of Patent: Aug. 21, 2012

(54) TOOL HANDLE, SLIDING COVER COMBINATION SLIDING COVER FOR TOOL HANDLE

(75) Inventor: Burton Kozak, Chicago, IL (US)

(73) Assignee: Combined Products Co. #1, Chicago, IL (US)

( * ) Notice: Subject to any disclaimer, the term of this patent is extended or adjusted under 35 U.S.C. 154(b) by 0 days.

(21) Appl. No.: 12/083,538

(22) PCT Filed: Aug. 20, 2007

(86) PCT No.: PCT/US2007/018429

§ 371 (c)(1),
(2), (4) Date: Apr. 14, 2008

(87) PCT Pub. No.: WO2008/021508

PCT Pub. Date: Feb. 21, 2008

(65) Prior Publication Data

US 2009/0229428 A1 Sep. 17, 2009

Related U.S. Application Data

(60) Provisional application No. 60/822,857, filed on Aug. 18, 2006.

(51) Int. Cl.
*B65G 1/08* (2006.01)

(52) U.S. Cl. .......................... 81/490; 81/177.4; 206/372

(58) Field of Classification Search .................. 206/349, 206/372, 373, 379; 81/177.4, 490, 489, 439, 81/492; 16/111.1

See application file for complete search history.

(56) References Cited

U.S. PATENT DOCUMENTS

| | | | | |
|---|---|---|---|---|
| 1,105,818 | A | 8/1914 | Moore | |
| 4,235,269 | A | 11/1980 | Kraus | |
| 4,241,773 | A * | 12/1980 | Personnat | 81/177.4 |
| 4,327,790 | A | 5/1982 | Stevens | |
| 4,924,733 | A * | 5/1990 | McKenzie | 81/438 |
| 5,121,803 | A | 6/1992 | Hartmann | |
| 5,474,182 | A * | 12/1995 | Reney | 206/379 |
| 5,662,013 | A * | 9/1997 | Lin | 81/490 |
| 5,896,606 | A | 4/1999 | Huang | |
| 6,029,549 | A * | 2/2000 | Baker | 81/439 |
| 6,032,332 | A | 3/2000 | Lin | |
| 6,220,129 | B1 * | 4/2001 | Shimansky | 81/490 |
| 6,237,451 | B1 * | 5/2001 | Wei | 81/490 |

(Continued)

OTHER PUBLICATIONS

PCT International Search Report for PCT/US2007/018429, International Filing Date Aug. 20, 2007, 3 pages.

(Continued)

*Primary Examiner* — Steven A. Reynolds

(74) *Attorney, Agent, or Firm* — Factor Intellectual Property Law Group

(57) ABSTRACT

A combination of an implement-storing tool-handle and a sliding cover for the tool handle where the implement-storing tool-handle heel comprises one or more first apertures in the cover allows extension of a telescopic implement such as a pick-up magnetic wand stored in the handle heel when the cover is in any of one or more first predetermined positions. The sliding cover for the implement-storing tool-handle heel may further comprise one or more second apertures in the cover conformed to allow retrieval of a bit stored in the handle only when the cover is in any of one or more second predetermined positions, where the second predetermined positions coincide with one or more of the first predetermined positions.

8 Claims, 3 Drawing Sheets

U.S. PATENT DOCUMENTS

| | | | | |
|---|---|---|---|---|
| 6,327,942 | B1 * | 12/2001 | Mariol et al. | 81/177.4 |
| 6,332,384 | B1 * | 12/2001 | Cluthe | 81/490 |
| 6,435,065 | B2 | 8/2002 | Kozak | |
| 6,508,156 | B1 * | 1/2003 | Wei | 81/490 |
| 6,860,178 | B2 * | 3/2005 | Wang | 81/177.2 |
| 7,051,626 | B1 | 5/2006 | Chen | |
| 7,069,828 | B2 * | 7/2006 | Huang | 81/489 |
| 7,073,417 | B2 * | 7/2006 | Beauchamp | 81/490 |
| 7,174,814 | B2 * | 2/2007 | Liao | 81/177.4 |
| 7,293,484 | B2 * | 11/2007 | Liu | 81/177.4 |
| 7,374,042 | B2 * | 5/2008 | Liu | 206/372 |
| 2006/0016301 | A1 * | 1/2006 | Huang | 81/489 |
| 2006/0162508 | A1 * | 7/2006 | Liu | 81/177.4 |
| 2007/0012144 | A1 * | 1/2007 | Abel et al. | 81/177.4 |

OTHER PUBLICATIONS

PCT Written Opinion of the International Searching Authority for PCT/US2007/018429, International Filing Date Aug. 20, 2007, 5 pages.

* cited by examiner

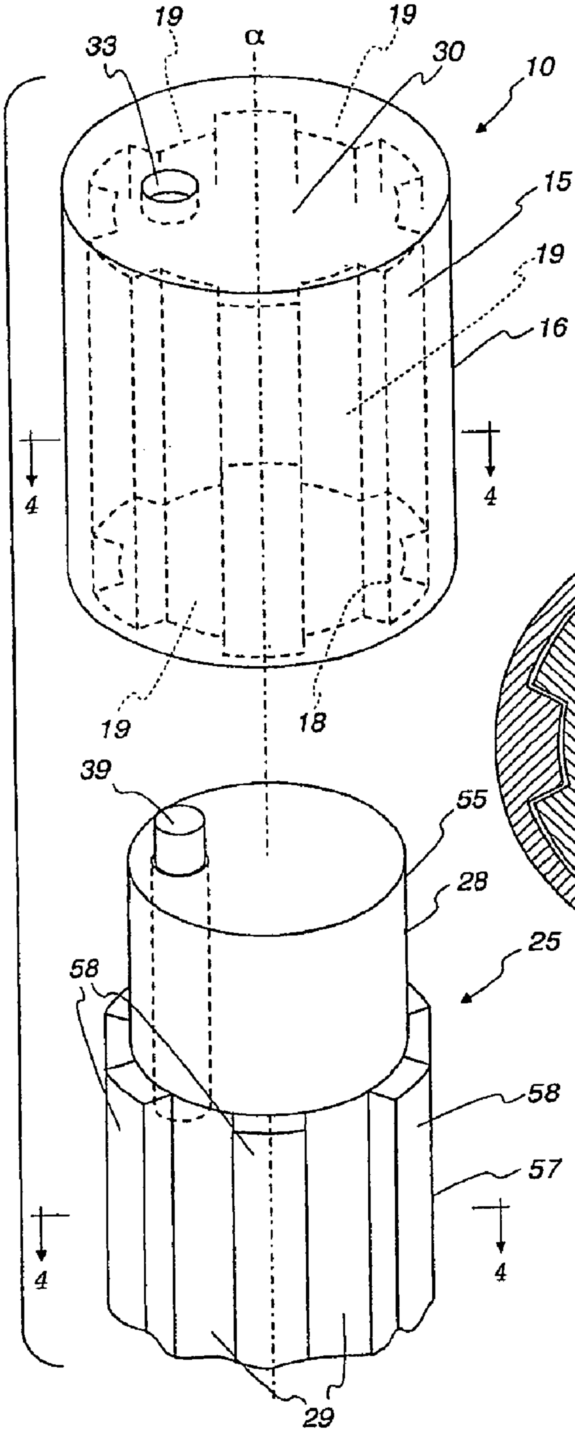
Fig. 3
Fig. 4
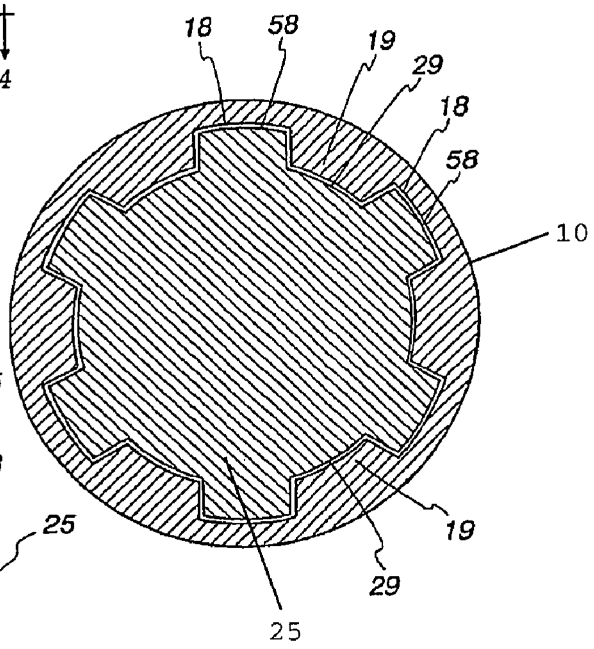

TOOL HANDLE, SLIDING COVER COMBINATION SLIDING COVER FOR TOOL HANDLE

RELATED APPLICATIONS

The present application claims the benefit of U.S. Provisional Application Ser. No. 60/822,587 filed on Aug. 18, 2006.

BACKGROUND OF THE INVENTION

1. Field of the Invention

This invention relates to the field of covers for tool handles, and more particularly, this invention relates to the field of sliding and rotating tool handle covers whereby the cover cooperatively interacts with user-selected features of the handle.

2. Background of the Invention

There are numerous patents disclosing tool handles with a telescopic implement such as a magnetic wand stored therein. Often such handles are intended to enable a multiplicity of functions. For example, U.S. Pat. No. 6,435,065, awarded to the instant inventor, provides a means for simultaneously accessing all tool bits displayed and stored in a tool handle.

However, there are instances where it is desired that not all bits be accessible simultaneously. For example, electrically isolating ferrous-based bits stored in a handle is desirous to minimize arcing, particularly in situations where electricians are using the tool. Such a handle would be combined with a cover to allow certain tasks while protecting implements stored in the handle. For example, the cover should provide access and to a selected bit while the other bits are shielded. The cover would also provide access to certain portions of the handle while keeping other portions out of sight.

SUMMARY OF THE INVENTION

An object of this invention is to provide a combination of an implement-storing tool-handle with a sliding cover therefor that overcomes deficiencies in the prior art.

Another object of this invention is to provide a combination of an implement-storing tool-handle with a sliding cover therefor to selectively provide access to all regions of the handle. A feature of this invention is apertures in the cover allowing use of a nut-setter and extension of a telescopic implement such as a magnetic wand from the heel of the handle at all times, but retrieval of a specific bit only when the cover is in a specific pre-determined position. An advantage of this invention is that while the telescopic implement and the nut-setter can be used at all times, bits stored in the heel or elsewhere in the handle are not accessible so as to not be accidentally dislodged, dropped and/or lost.

A further object of the present invention is to provide means to give selective access to a wide array of certain drill bits stored in the heel of the handle, while also providing means to retain other bits in place. A feature of this invention is that a cover for an implement-storing tool-handle will hold drill bits in fixed positions during use of the tool. An advantage of the invention is that the tool may be used in environments where a wide array of different bits is required, but also where lost bits or exposed bits would pose a hazard due to the presence of moving parts or electric voltage.

Yet another object of the present invention is to provide a cover for an implement-holding heel of a tool handle where the heel contains apertures for bits yet bits do not protrude from the heel of the handle during use. A feature of this invention is that the cover includes springing means attached to the heel of the tool handle or the cover of the tool handle that allows the cover to adjust axially in relation to the longitudinal axis of the handle, in response to applied pressure. An advantage of the present invention is that weight may be applied to the cover of the tool handle without coming in contact with the possibly sharp edges of the bits stored in the tool handle. An additional advantage of the present invention is that the implements stored in the heel of the tool handle are easily removed from the tool handle because upon removal of the spring-loaded cover the implements protrude from the tool handle.

An additional object of the invention is to provide a cover for an implement-storing tool-handle where the heel of the tool handle allows the position of the cover to be changed without complete removal of the cover. A feature of the present invention is that the heel of the tool handle is divided in two regions, wherein a cross section of a first, distal, or a topmost region of the handle is cylindrical while a cross section of second, proximal or lower region of the handle is hexagonal or of another shape that allows for torque to be applied through the cover to the tool handle without slipping. An advantage of the invention is that in order to move the cover to a different position the cover need not be removed completely. In the present invention, in order to move the cover to a new position, the cover which is in slidable communication with the handle, is moved up from the hexagonal second region into the cylindrical first region where it can be rotated freely.

Yet another object of the present invention is to prevent the loss of the cover by allowing the cover to be adjusted over a wide gamut of positions while providing means to prevent the complete removal of the cover from the heel of the tool-handle. A feature of the present invention is that the cover is attached to the heel of the tool handle using springing means. An advantage of the present invention is that the cover may be moved and its position adjusted, but the cover cannot be misplaced as the springing means prevent the cover's complete removal from the heel of the tool-handle.

Thus the present invention provides a combination of an implement-storing tool-handle and a sliding cover therefor where the implement-storing tool-handle heel comprises one or more first apertures in the cover conformed to allow extension of a telescopic implement such as a pick-up magnetic wand stored in the handle heel when the cover is in any of one or more first predetermined positions. The sliding cover for the implement-storing tool-handle heel may further comprise one or more second apertures in the cover conformed to allow retrieval of a bit stored in the handle only when the cover is in any of one or more second predetermined positions, where the second predetermined positions coincide with one or more of the first predetermined positions. The sliding cover also comprises a third aperture allowing uninterrupted access to a nut-setter socket formed as an integral part of the heel of the tool handle.

In brief, the present invention provides a combination of an implement-storing tool-handle and a sliding cover therefor where a number of implements are stored in the heel of the tool handle.

BRIEF DESCRIPTION OF THE DRAWING

The foregoing and other objects, aspects and advantages of this invention will be better understood from the following detailed description of the preferred embodiments of the invention with reference to the drawing, in which:

FIG. 3 is an overall elevational view of an alternative exemplary embodiment of a combination of an implement-storing tool-handle and a sliding cover therefor that allows selective access to bits stored in the handle heel simultaneously with immediate access to a telescopic implement such as a magnetic pick-up wand also stored in the handle heel, in accordance with features of the present invention;

FIG. 4 is a cross-section of FIG. 3 along the line 4-4; and

DETAILED DESCRIPTION OF THE INVENTION

The present invention provides a combination of an implement-storing tool-handle and a sliding cover therefor where a telescopic implement such as a magnetic wand is stored in the tool handle. A preferred embodiment of the cover both slidably communicates with an underlying handle (whereby the cover extends and slides along a longitudinal axis of the handle), while simultaneously being in rotatable communication with the handle (whereby the cover rotates about the periphery of the handle.

In one embodiment, this invention provides a combination of an implement-storing tool-handle and a sliding cover therefor that allows selective access to bits stored in the handle heel simultaneously with immediate access to a telescopic implement such as a magnetic pick-up wand also stored in the handle heel. For the sake of specificity the telescopic implement would be referred to as a magnetic pick-up wand throughout the remainder of this application.

In an exemplary embodiment of the present invention the sliding cover contains a region defining an aperture that allows retrieval of a bit only when the cover is in a specific position. The heel of the cover allowing extension of the pick-up wand regardless of what bit is also exposed. The invented handle cover may also include an aperture allowing continuous use of a nut-setter socket formed in the heel of the tool handle.

Figure 1:
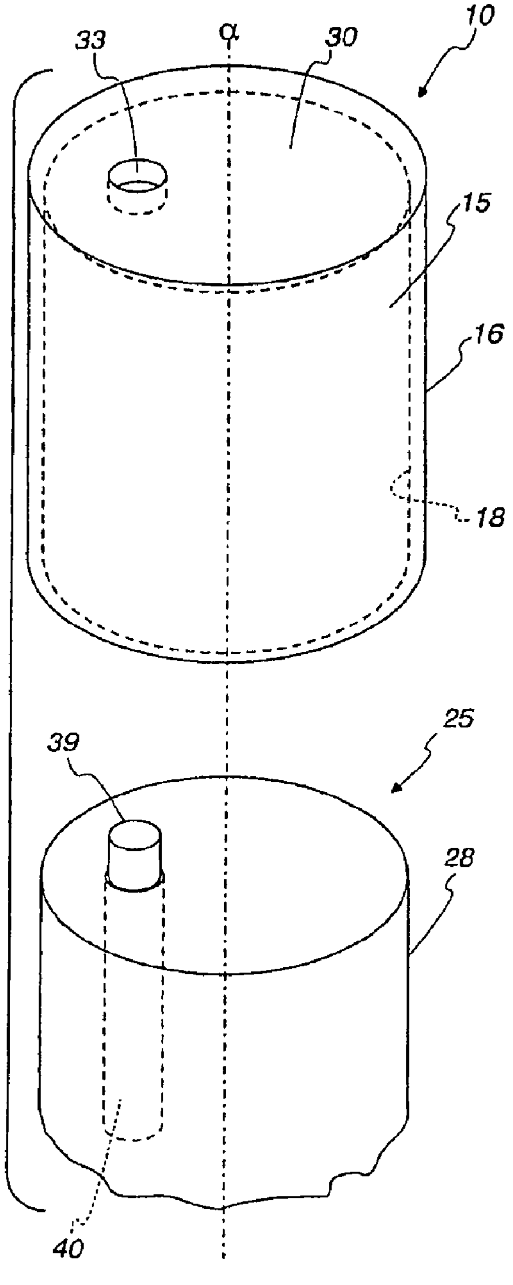
FIG. 1 is an overall elevational view of an exemplary embodiment of a combination of an implement-storing tool-handle and a sliding cover therefor that allows immediate access to a telescopic implement such as a magnetic pick-up wand stored in the handle heel, in accordance with features of the present invention.

A first embodiment of the invented combination of an implement-storing tool-handle and a sliding cover is shown in FIG. 1. The handle cover 10 has a generally cylindrical body 15 with an outer wall 16 and an inner wall 18. The inner wall 18 is configured to allow sliding communication between the cover 10 and the longitudinally extending side periphery wall 28 of a tool handle 25. The cover 10 is capped by a generally flat top surface 30. The top surface 30 comprises one or more first apertures 33 configured to allow access to, and adapted to slidably receive one or more first implements 39 stored in the tool handle 25. For instance, the first implements 39 may be telescopic implements such as magnetic wands, in which case the cover 10 allows extension of one or more magnetic pick-up wands 39 stored in the tool handle 25. (Usually the wands are stored in cavities 40 parallel to the longitudinal axis of the handle.) The present invention envisions embodiments where different magnetic wands are stored in the handle: i.e one wand may be long and slim and another may be shorter but sturdier. Also, the present invention envisions embodiments where other telescopic implements such as rulers, depth gages, pressure sensor, heat sensors, voltage sensors, electrical continuity probes, miniature lights, and other implements would be employed as a first implement 39 stored in tool handle 25.

In another embodiment (not shown), the body of the cover 15 and of the tool handle 25 feature a shape other than a cylindrical shape. It should be appreciated that the body of the cover 15 and tool handle 25 can be of any shape so long as the shapes facilitate sliding communication between the cover 10 and the longitudinally extending side periphery wall 28 of the tool handle 25. For instance, in one embodiment, the tool handle 25 can be of hexagonal shape and the cover 10 is of complementary hexagonal shape to sliding communication with the outer wall 28 of the tool handle 25.

Figure 2:
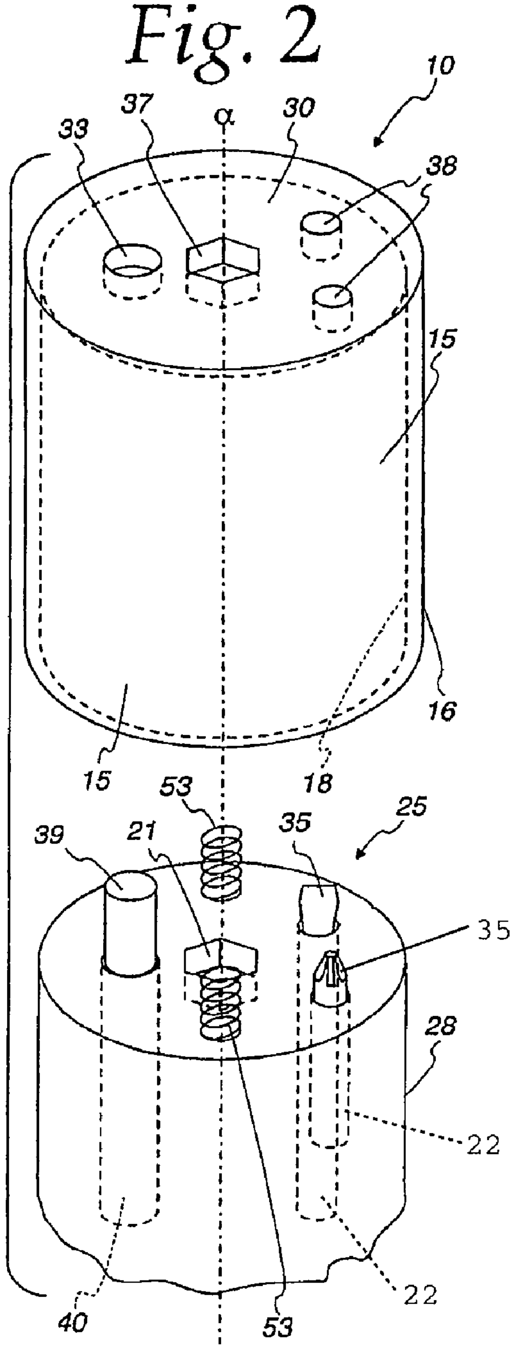
FIG. 2 is an overall elevational view of an exemplary embodiment of a combination of an implement-storing tool-handle and a sliding cover therefor that allows selective access to bits stored in the handle heel simultaneously with immediate access to a telescopic implement such as a magnetic pick-up wand also stored in the handle heel, in accordance with features of the present invention.

Turning now to FIG. 2, in another embodiment, the top surface 30 of the handle heel cover 10 comprises one or more second apertures 38 configured to allow extraction of second implements such as tool bits 35 stored in cavities 22 in a distal or heel (i.e., top region) portion of the tool handle 25. (It should be appreciated that the opposite end of the handle is the proximal end whereby the proximal end is adapted to rigidly receive bit holders and ultimately the bits to which the user of the tool applies torque upon turning the handle.) Also optionally, the handle-heel top surface 30 of the cover 10 comprises a third aperture 37 allowing access to a nut setter socket 21 formed in the heel. Generally, the handle heel may store several bits (phillips, tor-x, flat-blade, etc. . . . ) but the apertures are so arranged that a first aperture 33 is facing a first implement such as a telescoping wand 39 whenever a second aperture 38 is facing a tool bit 35. Thus extension of a wand 39 can occur unobstructed by the cover 10 whenever one of said first apertures 33 is in registration with the longitudinal axis of the magnetic wand 39. One embodiment enables this scenario when the first and second apertures are uniformly and alternately arranged in a circle centered on the axis of the heel of the handle 25. Optionally, the first apertures 33 and the second apertures 38 may be identical in shape.

In an embodiment of the present invention, both a distal or top portion of the side periphery 28 of the heel of the handle 25 and the inner wall 18 of the cover 10 are of cylindrical shape. In this embodiment the handle cover 10 is pulled distally a short distance away from the top surface of the heel of the handle 25 and then rotated until a desired bit 35 is facing a second aperture 38 while a magnetic wand 39 is facing a first aperture 33.

An inwardly directed surface of the handle-heel overlaying surface of the cover 10 is in opposition to the surface of the heel of the handle 25. This inwardly directed surface is adapted to removably attach a first end of a spring, while a second end of the spring is removably attached to the heel of the handle 25. As such, the springs are positioned intermediate the inwardly directed surface and the handle heel. Fully compressed, the springs provide support of the inwardly directed surface such that a head space is formed between the heel of the handle 25 and the inwardly directed surface. This enables the tips of the stored wands and bits 35 to remain below the top surface 30 of the cover 10 when the tool handle 25 is grasped. As bits 35 remain below surface 30, pressure can be applied on the top surface 30 of the cover 10 without coming in contact with the potentially sharp end points of tool bits 35.

In an embodiment of the invention as shown, the handle-heel top surface 30 of the cover is depicted as generally flat. However, other topographies, such as convex topographies are envisioned to accommodate over-long hardware protruding past the head-space allowance discussed supra.

Fully extended, the springs provide a retracting mechanism so as to spring bias the cover, pulled in a distal direction along the longitudinal axis of the handle, back to a fully nested position upon release of the distally-directed pressure.

Further, in another embodiment of the invention spring-like elements 53 are attached to the flat surface of the tool handle 25. In an alternative embodiment, the spring-elements 53 are attached to the inner wall 18 of the cover body 15 instead. In this alternative embodiment, the spring elements do not obscure access to tool bits 35 when the cover 10 is removed from the top region of the heel of the tool handle 25.

In yet another embodiment of the invention (not shown), one spring-like element 53 is connected to both the top region of the heel of the to handle 25 and also to the inner wall 18 of the body 15 of the cover 10. The spring-like element 53 is attached so as to be permanently fixed to the top surface of the tool handle 25. However, it is attached to a channel in the inner wall 18 of the cover 10 so as to allow the top of the spring-like element 53 to rotate. In this embodiment, the spring-like element 53 allows rotation of the cover 10 by allowing the cover 10 to be lifted off of the heel of the handle 25. However, the spring-like element 53 prevents complete removal of the cover 10 from the handle 25. As such, the spring-like element allows the movement of the cover 10 while preventing loss of said cover.

It should be appreciated that spring-like means 53 may be comprised of any compressible material such as metal as a traditional spring. However, the spring-like means 53 could also be comprised of material such as plastic, rubber, or even fabric that is capable of returning to a predefined shape following a stretching of the material.

Another embodiment is depicted in FIG. 3. As shown in FIG. 3, ridges 19 protrude radially from the inner wall 18 of the cover 10. These ridges are parallel to the axis a of the tool handle 25 and they are in sliding communication with flutes 29 on a second section 57 of the side periphery of the tool handle 25, said flutes being formed by protrusions 58 from the periphery wall 28. One can rotate the cover 10 after disengaging it from the fluted section 57. The handle heel terminates in a circular cylindrical region 55 that is in slidable and rotatable communication with the ridges 19. Thus when the cover 10 is pulled clear of the protrusions 58 and flutes 29 found in the second region 57 of the heel of the tool handle 25, the cover may be rotated so that the desired aperture alignment is affected.

The cooperation of the flutes 29 and protrusions 58 of the tool handle 25 with the ridges 19 of the cover 10 of one embodiment are depicted in detail in FIG. 4. FIG. 4 is a cross-section of the embodiment described in FIG. 3 along the line 4-4 when the cover 10 is engaged on the end of the heel of the tool handle 25. As depicted in FIG. 4, ridges 19 are formed in inner wall 18 of the cover 10. Flutes 29 of the tool handle meet ridges 19 of cover 10. Further, inner wall 18 of cover 10 accommodates protrusions 58 of tool handle 25.

Figure 5:
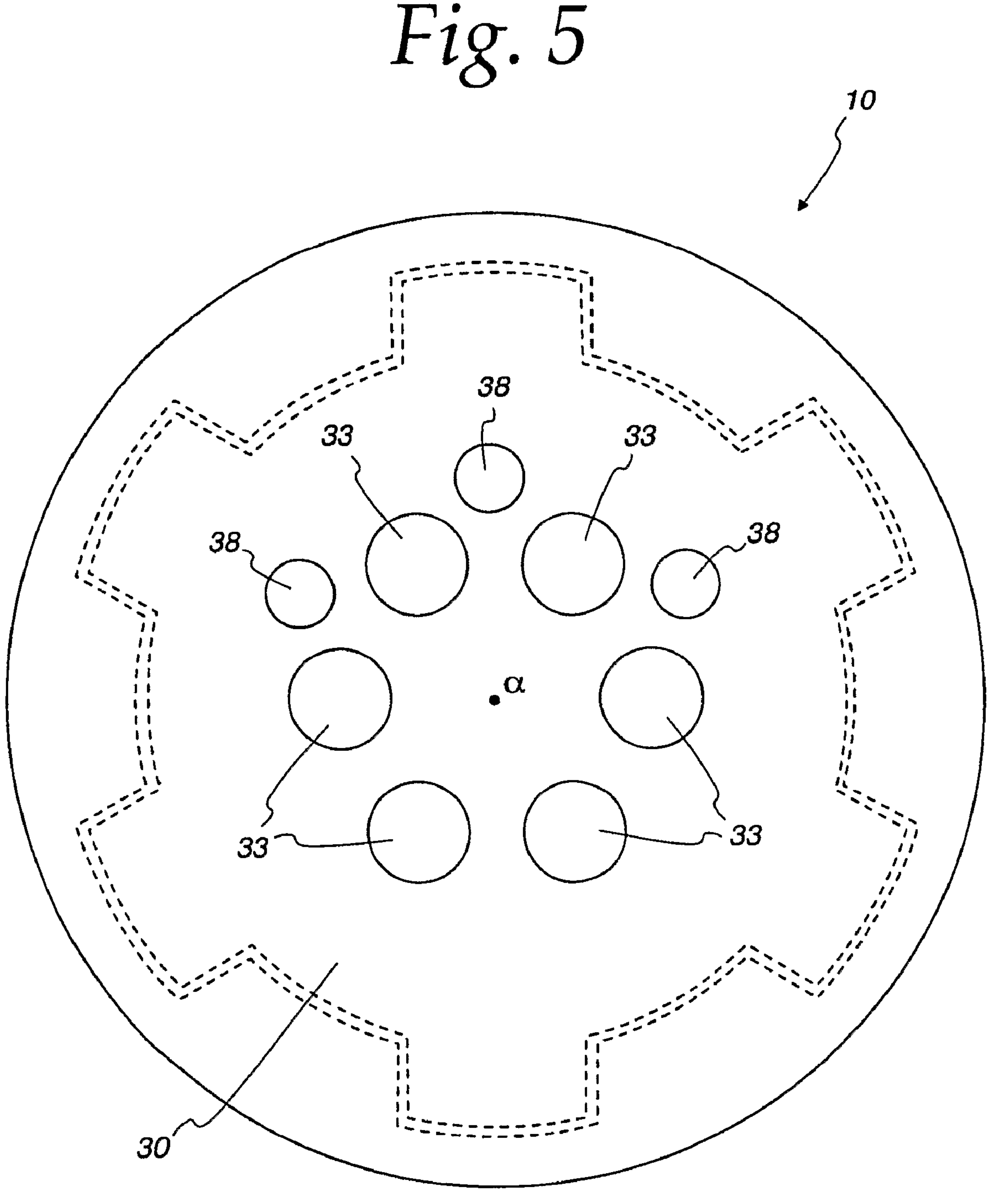
FIG. 5 is a schematic top view of an alternative embodiment of the top of a handle cover, in accordance with features of the present invention.

FIG. 5 is a schematic top view of an alternative embodiment of the top of a handle cover for a tool handle whose outer wall comprises six lateral flutes. The top surface 30 of the cover comprises six first apertures 33 each adapted to allow access to and extension of the first implement through the first aperture 33. These apertures are equally spaced on a circle centered at the axis a so that the magnetic wand may be extended in any of the six possible orientations of the cover relative to the handle. The top surface 30 may comprise one or more second apertures 38 for the retrieval of bits stored in the handle. One may choose to have no more than five of these second apertures 38 so that for a specific cover/handle orientation only particular tool bits are exposed while the magnetic wand may still be retrieved. In the embodiment shown in FIG. 5, the first apertures 33 and the second apertures 38 are not found on the circumference of a single circle whose center is point $\alpha$.

In an alternative embodiment of the invention (not shown), the six of the first apertures on top of the cover and all of the second apertures on top of the cover are evenly distributed on circumference of a single circle whose center is point $\alpha$. In this alternative design, for a specific cover/handle orientation, the first implement remains accessible regardless of the position of the cover. However, only as many of the second implements are accessible as there are second apertures. In this alternative embodiment, it is possible to arrange the cover such that the first implement is always accessible, while the second implements are kept in place by the cover.

A variety of materials are suitable for fabrication of the invented handle cover. A transparent plastic material is most suitable. In addition to its use in conjunction with the tool handle described herein, the invented handle cover can be used in conjunction with a myriad of presently available tool handles.

The present invention is a combination of an implement-storing tool-handle and a sliding cover for a heel of the tool handle comprising a tool-handle comprising means for storing one or more first implements in the heel of the handle; and a sliding cover for said heel comprising one or more first apertures in the cover each conformed to allow access to a first implement stored in the heel.

While the inventions has been described in the foregoing with reference to details of the illustrated embodiments, these details are not intended to limit the scope of the invention as defined in the appended claims.

The embodiment of the invention in which an exclusive property or privilege is claimed is defined as follows:

1. A sliding cover for covering an implement-storing tool-handle, the cover comprising:

one or more apertures in a top surface of the cover conformed to allow retrieval through the top surface of the sliding cover of one or more first implements stored in a heel of the tool-handle, and at least one ridge, the cover being slidable over the tool-handle heel and being positionable on the tool-handle heel to allow simultaneous access to the one or more first implements and a plurality of second implements stored in the heel;

wherein the sliding cover and tool-handle have a first configuration allowing the sliding cover to be rotated independently of the tool-handle, and a second configuration wherein the at least one ridge of the sliding cover engages the tool-handle so that the sliding cover and tool-handle are rotated together, and the sliding cover is precluded from rotating independently of the tool-handle by the at least one ridge, and wherein both the first configuration and the second configuration includes the sliding cover covering at least a portion of the tool handle.

2. The sliding handle cover recited in claim 1 wherein said one or more apertures allow extension of the one or more first implements stored in the handle only when the cover is in any of one or more first predetermined positions.

3. The cover as recited in claim 1 wherein none of the apertures are in registration with the second implements when a first aperture is in registration with said one or more first implements.

4. The cover recited in claim 1 further comprising one or more second apertures in said cover conformed to allow retrieval of said one or more second implements stored in the handle.

5. The cover recited in claim 4 wherein said one or more apertures in said cover are conformed to allow retrieval of one or more second implements stored in the handle only when said cover is in any of one or more said first predetermined positions.

6. The cover as recited in claim 1 further comprising one or more spring means attached to said cover and intermediate said cover and said tool-handle.

7. The cover as recited in claim 1 further comprising a third aperture conformed to allow use of a nut-setter socket in the tool-handle.

8. The cover as recited in claim 1 further comprising the at least one ridge in sliding communication with at least one flute in the tool-handle.

* * * * *